United States Patent [19]
Zelenak

[11] Patent Number: 5,645,404
[45] Date of Patent: Jul. 8, 1997

[54] PERSONAL FLUID DISPENSING DEVICE

[75] Inventor: John M. Zelenak, West Bloomfield, Mich.

[73] Assignee: Z Industry, Inc., Southfield, Mich.

[21] Appl. No.: 365,688

[22] Filed: Dec. 29, 1994

[51] Int. Cl.$^6$ ............................................. F04B 49/00
[52] U.S. Cl. ........................... 417/1; 222/175; 222/626
[58] Field of Search .............................. 222/175, 608, 222/626; 200/61.47, 61.52, 183, 215, 61, DIG. 2; 340/689; 417/1

[56] References Cited

U.S. PATENT DOCUMENTS

| | | |
|---|---|---|
| 33,343 | 9/1861 | Garrick . |
| 357,272 | 2/1887 | Donavin . |
| 581,767 | 5/1897 | Powers . |
| 1,637,635 | 8/1927 | Corley . |
| 2,013,358 | 9/1935 | Osborne . |
| 2,219,604 | 10/1940 | Trotter . |
| 2,380,372 | 7/1945 | Alderfer . |
| 2,958,155 | 11/1960 | Emmerich . |
| 2,999,499 | 9/1961 | Willet . |
| 3,223,286 | 12/1965 | Sawyer . |
| 3,227,866 | 1/1966 | Peters et al. .................. 200/61.47 |
| 3,403,818 | 10/1968 | Enssle . |
| 3,819,151 | 6/1974 | Kish . |
| 3,822,720 | 7/1974 | Souza . |
| 3,901,449 | 8/1975 | Bochmann ................... 239/332 |
| 3,910,725 | 10/1975 | Rule . |
| 4,060,182 | 11/1977 | Kikuchi . |
| 4,089,446 | 5/1978 | Logan, II et al. . |
| 4,089,447 | 5/1978 | Achmeteli . |
| 4,095,726 | 6/1978 | Hechler, IV et al. . |
| 4,095,812 | 6/1978 | Rowe . |
| 4,139,130 | 2/1979 | Glusker . |
| 4,154,375 | 5/1979 | Bippus . |
| 4,176,772 | 12/1979 | Danon . |
| 4,189,075 | 2/1980 | Hall . |
| 4,253,454 | 3/1981 | Warncke . |
| 4,265,381 | 5/1981 | Muscatell . |
| 4,345,704 | 8/1982 | Boughton . |
| 4,348,562 | 9/1982 | Florin ........................ 200/61.52 |
| 4,449,654 | 5/1984 | Cappis . |
| 4,469,097 | 9/1984 | Kelman . |
| 4,526,298 | 7/1985 | Boxer et al. . |
| 4,544,087 | 10/1985 | Modig . |
| 4,629,098 | 12/1986 | Eger . |
| 4,661,663 | 4/1987 | Weinheimer ................. 200/61.47 |
| 4,739,905 | 4/1988 | Nelson . |
| 4,739,913 | 4/1988 | Moore . |
| 4,768,681 | 9/1988 | Dean et al. ..................... 222/175 |
| 4,776,495 | 10/1988 | Vignot . |
| 4,796,323 | 1/1989 | Benz ........................... 200/61.52 |
| 4,801,088 | 1/1989 | Baker . |
| 4,807,813 | 2/1989 | Coleman ....................... 222/175 |
| 4,815,635 | 3/1989 | Porter . |
| 4,852,781 | 8/1989 | Shurnick et al. . |
| 4,882,801 | 11/1989 | Benz ........................... 200/61.52 |
| 4,903,864 | 2/1990 | Sirhan . |
| 4,911,339 | 3/1990 | Cushing . |
| 4,921,143 | 5/1990 | Billet . |
| 4,925,105 | 5/1990 | Lin . |
| 4,941,598 | 7/1990 | Lambelet, Jr. et al. . |
| 4,948,023 | 8/1990 | Tripp . |
| 4,997,110 | 3/1991 | Swenson ....................... 222/175 |
| 5,060,833 | 10/1991 | Edison et al. . |
| 5,062,591 | 11/1991 | Runkel . |

(List continued on next page.)

FOREIGN PATENT DOCUMENTS 893003  2/1975  Canada .................. 222/175

*Primary Examiner*—Timothy Thorpe
*Assistant Examiner*—Xuan M. Thai
*Attorney, Agent, or Firm*—Harness, Dickey & Pierce P.L.C.

[57] ABSTRACT

A personal fluid delivery device includes an electronic pump system and may also include a fluid reservoir system. The fluid reservoir system includes a fluid reservoir and a delivery tube disposed in communication therewith. The electronic pump system includes a pump operable for delivering fluid from the fluid reservoir, an electrical power supply for supplying power to the pump, a dispensing tube operable for providing a passageway for dispensing fluid from the fluid reservoir and an actuating device operable for selectively actuating the pump.

20 Claims, 4 Drawing Sheets

U.S. PATENT DOCUMENTS

| | | |
|---|---|---|
| 5,085,349 | 2/1992 | Fawcett . |
| 5,104,016 | 4/1992 | Runkel . |
| 5,143,390 | 9/1992 | Goldsmith . |
| 5,150,837 | 9/1992 | Ferrari ................................. 222/175 |
| 5,154,317 | 10/1992 | Roppolo, III . |
| 5,158,208 | 10/1992 | Wilson ................................. 222/175 |
| 5,158,212 | 10/1992 | Sirhan . |
| 5,158,218 | 10/1992 | Wery . |
| 5,188,610 | 2/1993 | Rains ................................. 222/175 |
| 5,201,442 | 4/1993 | Bakalian . |
| 5,215,231 | 6/1993 | Paczonay . |
| 5,248,089 | 9/1993 | Bekius ................................. 222/175 |
| 5,282,557 | 2/1994 | McCook ................................. 222/175 |
| 5,303,847 | 4/1994 | Cottone . |
| 5,326,124 | 7/1994 | Allemang . |

PERSONAL FLUID DISPENSING DEVICE

BACKGROUND OF THE INVENTION

1. Technical Field

This invention relates generally to personal fluid dispensing devices, and more particularly to an electrically powered hand-portable dispensing device for potable beverages.

2. Discussion

It is often desirable and/or necessary during many activities, especially strenuous physical activities, and within many environments, such as unusually warm or dry environments, to replenish body fluids that are lost through natural processes. This is especially true during strenuous exercise and work activities, and during prolonged exposure to the sun, where dehydration is accelerated through increased perspiration. Many activities also take people to locations where a convenient fluid refreshment supply is not available, as is the case for many remote outdoor recreational and work activities. For these and other reasons, many persons, such as athletes, persons involved in strenuous work activities and persons exposed to warm environments, choose to bring hand-portable fluid containers with them during their various activities.

Many times, however, the use of a hand-portable fluid container which must be carried by hand or moved by hand between different locations is not convenient or practical. For example, many work and exercise activities require the use of both hands for other purposes or require that the hands be kept free for safety or for balance. In many situations it may even not be convenient to require the periodic use of one hand to relocate a hand-portable fluid container so that it remains near a person who is moving about frequently from location to location. This is especially true during exercise and other physical activities involving continuous movement. In these and other situations, there also may not be any convenient nearby surface for placing such a fluid container. Therefore, it has become desirable to have a device whereby fluid may be carried in a portable manner without the need for repeated occupation of one or more hands.

Developments which have occurred in the area of portable fluid containers have included several hand-portable fluid containers that are mountable upon an associated structure, such as a bicycle, or have been located within some type of body-carried assembly. These devices have several disadvantages, however, most of which are related to the way that fluid is extracted from the fluid container for use. As a primary example, in many such devices, it is necessary to extract fluid from the fluid reservoir through the application of suction by the mouth to the end of a tube connected to the reservoir. This is inconvenient and undesirable in many applications, since in many activities, especially those involving heavy physical exertion, it is often difficult and/or energy-consuming to apply suction through a length of tube for extracting fluid from the reservoir. Some devices have attempted to reduce this disadvantage by providing some type of manual pumping means to force fluid from the reservoir through an associated dispensing tube. Such devices, however, require the user to manually operate various types of levers, bellows or other manual pumping devices, which tends to be cumbersome and/or energy-consuming, and therefore also undesirable.

Other devices have attempted to solve the disadvantage mentioned above by providing an independent pressure means, such as a pressurized gas cylinder located adjacent the fluid reservoir. This type of system has the disadvantages of being cumbersome, heavy, and requiring replacement of the pressurized gas cylinder. In addition, this type of system sometimes requires repeated manipulation or regulation of the device components in a manner that is not quickly or conveniently accomplished, because it requires manual dexterity over time, such as in the rotary manipulation of a valve control. Other liquid delivery systems utilize gravity for providing the delivery force for liquids by positioning fluid containers at a level above the end of a flow line connected thereto so that a hydrostatic head exists between the container and the mouth of the user. One such liquid delivery system provides a container for storing liquid that is mounted to the back of a bicyclist in a backpack arrangement. This arrangement, however, requires that the backpack be in an elevated position, which occurs only where the bicyclist is in a racing position. Where the backpack is not in an elevated position, suction is required to extract fluid from the reservoir, absent some other means for fluid delivery.

It may also sometimes be desirable during the above-mentioned activities to apply water to other body surfaces, such as to the head, in order to facilitate cooling of the body. Such application cannot typically be accomplished where suction by mouth is required for extracting fluid from a reservoir. This may be accomplished, however, where a system allows for automatic delivery of fluid in a spray from a dispensing tube.

The need therefore exists for a personal fluid dispensing device that is operable to deliver fluid from a reservoir to a person's mouth or to another location of a person's body. The need further exists for such a device that is mountable upon a person's body or an associated structure, that is lightweight, easily manipulable and conveniently actuated, and does not require lengthy manual dexterity for its operation.

SUMMARY OF THE INVENTION

In accordance with the present invention, a personal fluid delivery device is provided. The device includes a pump that is operable for delivering fluid from a fluid reservoir and an electrical power supply for supplying power to the pump. A dispensing tube is disposed in communication with the pump and is operable for providing a passageway for dispensing fluid from the fluid reservoir. The personal fluid delivery device also includes an actuating device for selectively actuating the pump. The pump, electrical power supply, dispensing tube and actuating device may be disposed in communication with an existing fluid reservoir for providing selectively actuatable fluid dispensing from the reservoir. The device may also include its own fluid reservoir that is operable for containing a fluid.

An advantage of the present invention is to provide a hand-portable device, especially a body-carried device or a device mountable on an associated structure, which can supply a potable beverage for replenishing body fluids.

Another advantage of the present invention is to provide a device for supplying a fluid without the need for applying suction by mouth to a dispensing tube connected to a fluid reservoir.

A further advantage of the present invention is to provide a device for supplying a fluid without requiring a hydrostatic head between a fluid reservoir and the desired delivery location of fluid.

A further advantage of the present invention is to provide a device for supplying a fluid without the need for extensive mechanical manipulation or lengthy manual dexterity relating to components of a fluid system.

A further advantage of the present invention is to provide a device for supplying a fluid which includes a selectively actuatable means for transferring the fluid from a reservoir to the user at a desired location.

A further advantage of the present invention is to provide a device which accomplishes the above advantages while being lightweight and quick and convenient to operate.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

While it should be understood that this invention is described in connection with particular examples thereof, the scope of the invention need not be so limited. Rather, those skilled in the art will appreciate that the following teachings can be used in a much wider variety of applications than the examples specifically mentioned herein.

Figure 1:
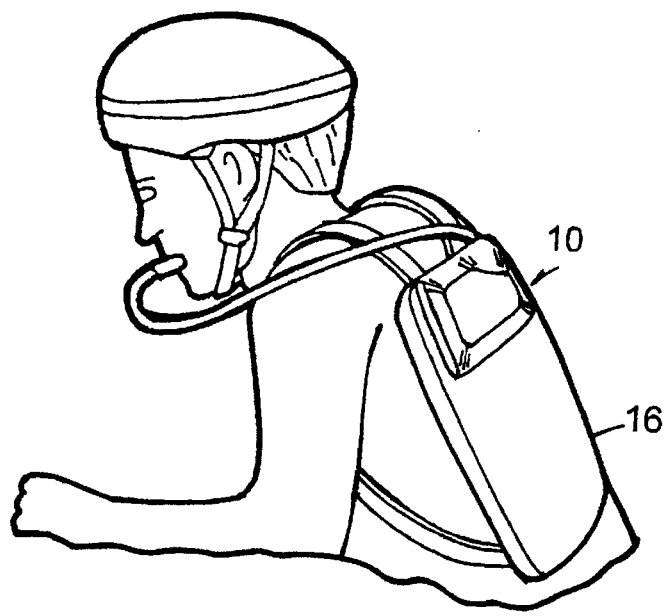
FIG. 1 is a side elevational view of a device according to a preferred embodiment of the present invention, shown in the environment of being mounted upon a bicyclist.

Referring now to the drawings in which like reference numerals designate like or corresponding components throughout the several views, there is shown in FIG. 1 a personal fluid delivery device that is generally designated by the numeral 10. The personal fluid delivery device 10 is functionally depicted as being mounted upon the back of a bicyclist. It will be appreciated, however, that the personal fluid delivery device 10 may be hand-carried, may be mounted upon any suitable portion of the human body, or upon an associated structure or item of equipment, and may also be used in a wide variety of exercise, work and other activities besides bicycling. Some examples of these types of activities include, but are not limited to, construction work, climbing, hunting, camping, fishing, hiking, running, jogging, walking and other activities where physical exertion may increase the depletion of the body's fluid supply, or where other sources of fluid will be unavailable for an extended period of time. One example of an associated piece of equipment upon which the device of the present invention may be mounted is a bicycle. The personal fluid delivery device 10 of the present invention may be useful for delivering different types of fluids, particularly potable beverages.

Figure 2:
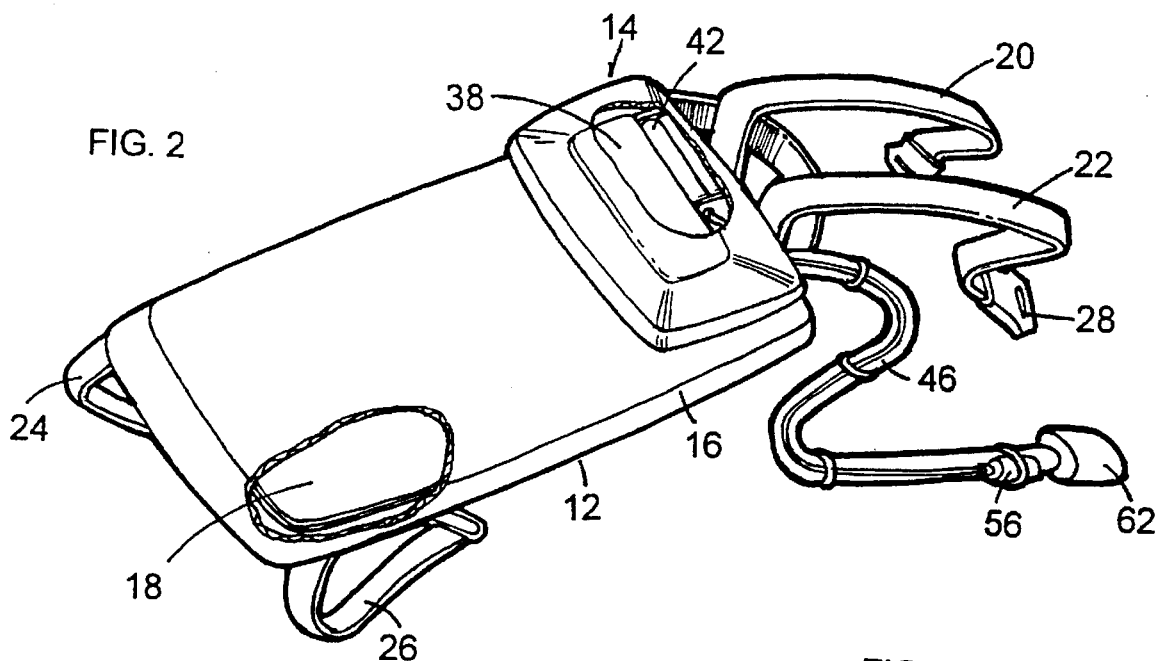
FIG. 2 is a partial cutaway view illustrating the components of a device according to a preferred embodiment of the present invention.

Referring now to FIG. 2, the personal fluid delivery device 10 is shown in greater detail. The personal fluid delivery device 10 may include a fluid reservoir system 12 and an electronic pump system 14. Optionally, the components of the electronic pump system 14 may be utilized with an existing fluid reservoir, such as a water bottle or other type of hand-portable or body-carried reservoir. In such a situation, the personal fluid delivery device 10 includes only the components of the electronic pump system 14 as will be discussed below. The following example will be used to describe a personal fluid delivery device 10 which includes both a fluid reservoir system 12 and an electronic pump system 14. It will be understood, however, that the following description may be adapted to substitute an existing fluid reservoir for the fluid reservoir system 12 discussed herein.

The fluid reservoir system 12 is shown in a preferred embodiment to include a reservoir container operable to support and/or substantially surround a fluid reservoir disposed therewithin. The reservoir container is preferably suitable for being hand-carried, body-carried or mountable upon an associated structure or item of equipment. In a preferred embodiment, shown in FIGS. 1 and 2, the reservoir container is provided as a backpack 16. The backpack 16 is operable to support and/or substantially surround a fluid reservoir 18 disposed therewithin. The reservoir container preferably also includes one or more support devices for enhancing an engaged relation of the reservoir container with the surface to which it is being engaged. In the embodiment shown in FIG. 2, the backpack 16 is provided with a pair of upper support straps 20 and 22 and a corresponding pair of lower support straps 24 and 26 as support devices. The upper support straps and lower support straps are operable for being disposed about a person's shoulders for enhancing a substantially secured condition of the backpack 16 upon a person's back. As such, the upper support straps 20 and 22 and lower support straps 24 and 26 may preferably include suitable engagement devices for enhancing an engaged relation between one or more upper support straps and one or more lower support straps. These may be provided as buckle portions 28 and 30, although it will be realized that any suitable engagement devices may be used. It will further be appreciated that any other suitable retaining structure or equipment may be utilized, including bands, straps, clips and hook and loop fasteners.

The backpack 16 also includes an elongated aperture (not shown) for facilitating removal and replacement of the fluid reservoir 18 and/or any other items in and out of the backpack 16 as may be needed for cleaning, maintenance or refilling. The elongated aperture may include one or more closures, such as one or more zippers or snaps, or overlapping fabric portions or extensions, fitted with suitable closures such as straps or one or more associated hook and loop fastener portions which engage one or more corresponding fabric portions located on an adjacent surface of the backpack 16 or on another section of a strap, fabric portion or extension. The backpack 16 may also include one or more carrying extensions, handles or straps (not shown) for facilitating hand-portability or manipulation during preparation or use. These may be constructed of nylon or other suitable material, and may be sewn or otherwise affixed or attached directly to the backpack material.

The backpack 16 may be of any suitable size or configuration for accomplishing the task of supplying fluid. It is preferably constructed in an elongated design that is narrow enough to allow shoulder movement when mounted upon a person's back, yet large enough to accommodate a fluid reservoir of the desired capacity. The backpack 16 is preferably constructed of a flexible, lightweight durable material that is resistant to water and soiling, and is durable enough to withstand the stresses of energetic athletic or work activity with which the personal fluid delivery device 10 is associated. A preferred material selection is a synthetic elastomer material, such as neoprene, due to its resistance to infiltration by water, dirt and other contaminants. It will be appreciated, however, that any other material may be used that is suitable for supporting the fluid reservoir 18.

The backpack 16 may include other features and accessories which serve to enhance the performance of the fluid reservoir system 12. One example of such a feature is an insulation layer (not shown) surrounding the fluid reservoir 18 which may enhance maintenance of a desired fluid temperature (hot or cold) within the fluid reservoir 18. The backpack 16 may also optionally include one or more additional apertures, pouches, pockets, supports and extensions of material (not shown) as may be desirable for facilitating the use of other accessories or equipment with the personal fluid delivery device 10. These locations may preferably also be provided with closures for inhibiting the introduction of dirt, water or other contaminants into the backpack 16 at these locations.

Figure 3:
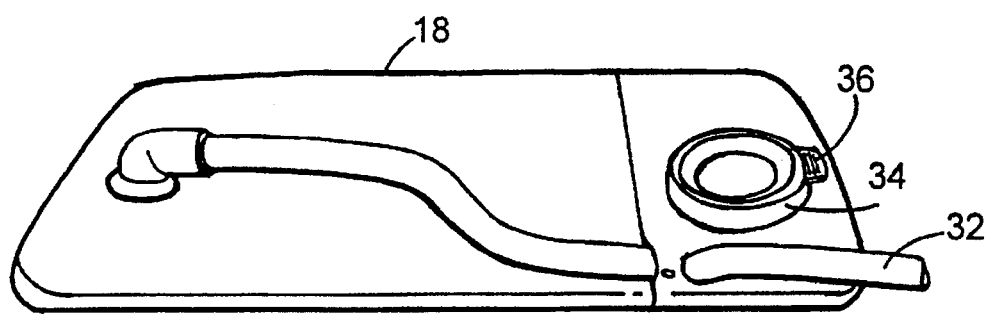
FIG. 3 is perspective view of a fluid reservoir according to a preferred embodiment of the present invention.

Referring now to FIG. 3, there is shown a fluid reservoir 18, as previously mentioned. In a preferred embodiment, the fluid reservoir 18 is operable for being contained within a reservoir container, such as the backpack 16. Alternatively, the fluid reservoir 18 may itself be operable for use without being located within a reservoir container, by being hand-carried, body-carried or mountable upon an associated structure or item of equipment. The fluid reservoir 18 may be of any suitable size and configuration, such as a size and configuration suitable for being used with the backpack 16, and for containing a sufficient volume of fluid to be useful during the desired activity. Typically, the fluid reservoir 18 is constructed to be roughly the same shape and of smaller overall dimensions as those of the reservoir container, or a portion thereof, within which it is placed. The fluid reservoir 18 may preferably be constructed of a lightweight, flexible, and preferably collapsible material that is suitable for containing a potable beverage, such as polyurethane. The fluid reservoir 18 is also preferably constructed of a material that is transparent or translucent for facilitating estimation of the fluid remaining within the reservoir by sight. Alternatively, the fluid reservoir 18 may be constructed of any other material suitable for containing a fluid, and may be constructed of a substantially rigid material. One advantage of a collapsible plastic fluid reservoir is that its volume decreases as the fluid stored therewithin is being depleted, thereby reducing the volume of the backpack 16 as a whole over time.

As shown in FIG. 3, a delivery tube 32 is shown to be disposed in communication with the fluid reservoir 18. The delivery tube 32 is preferably operable to provide a passageway for the delivery of fluid from the fluid reservoir 18 to the electronic pump system 14, as will be described in more detail below. The delivery tube 32 is preferably an elongated flexible tube made of a material suitable for delivering a potable beverage, such as silicone. Preferably, the delivery tube 32 is disposed in communication with the fluid reservoir 18 near the bottom of the fluid reservoir 18, so as to have access to a substantially complete volume of fluid located within the fluid reservoir 18 when oriented in a substantially upright position. One preferred arrangement for the delivery tube 32 is shown in FIG. 3, where the delivery tube 32 extends along the external surface of the fluid reservoir 18. Alternatively, the delivery tube 32 may enter the fluid reservoir 18 from another portion of the reservoir, such as the top portion, and may extend to the bottom of the fluid reservoir 18 through its interior.

In the situation where the electronic pump system is used with an existing fluid reservoir, the delivery tube 32 is disposed in communication with the fluid reservoir in a similar fashion. The delivery tube 32 may be inserted within or may be affixed to an opening in a closure or other suitable opening of the fluid reservoir so as to access fluid contained therewithin. The delivery tube 32 may also be disposed in communication with a pre-existing output tube or other output device of the fluid reservoir. If desired, any of the fluid connections set forth herein may be accomplished through the use of suitable adapters, reducers or connectors, which may preferably be removably attached for convenience in refilling, use and maintenance.

The fluid reservoir 18 is also shown to include a port 34 that is operable for providing an opening for filling the fluid reservoir 18. Preferably, the port 34 is located near the upper end on the top surface of the fluid reservoir 18, so that the fluid reservoir 18 may be substantially completely filled before the top fluid level reaches the port 34. The fluid reservoir 18 may also preferably include a closure 36 that is operable for enhancing a substantially sealed condition of the port 34. The closure 36 may preferably be of a snap-on ring type which can be easily removed and replaced in a repeated manner. A convenient construction for the port 34 and closure 36 is to have these components constructed of a single piece of material, such that a flexible piece of material joins the two. In this arrangement, the closure 36 remains connected to the port 34 at all times, so that the closure 36 is not misplaced. It will be appreciated, however, that any other suitable arrangement may be used.

Referring now to FIGS. 2 and 4–6, the electronic pump system 14 will be described in further detail. It will be appreciated that where a preexisting fluid reservoir is used, the electronic pump system 14 will itself be the personal fluid delivery device 10 of the present invention. For purposes of explanation, however, the electronic pump system 14 will be described as part of a personal fluid delivery device 10 that includes a fluid reservoir 18 of the type previously mentioned. The electronic pump system 14 is shown to include a pump 38 that is operable for delivering fluid from the fluid reservoir 18 to a desired external location. The pump 38 is preferably a DC-operated electric pump that is lightweight and compact in size, so that it may be carried along with the fluid reservoir 18. One suitable type of pump for this application is a 6 volt electric ABS plastic hobby pump of the type available from hobby supply companies. It will be realized, however, that any suitable type of pump constructed from any suitable material may be used.

Figure 5:
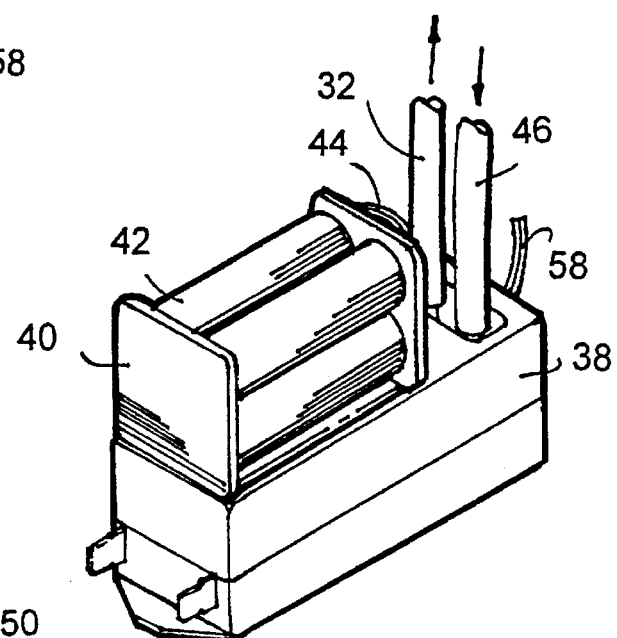
FIG. 5 is a perspective view of a battery pack and electronic pump of the type used according to a preferred embodiment of the present invention.

The electronic pump system 14 also includes an electrical power supply operable for electrically powering the pump 38. In a preferred embodiment, this is provided as a battery pack 40, which is shown in FIG. 5 to hold 4–1.5 volt AA batteries 42 for providing 6 volt pump operation. The battery pack 40 may comprise one or more disposable batteries or one or more rechargeable batteries. A connection wire 44 is disposed in electrical communication with the pump 38 and the battery pack 40 for delivering electrical power to the pump 38. It will be appreciated that any suitable arrangement for the battery pack 40 may be used, as long as it provides the required voltage and amperage for powering the pump 38. Alternatively, any other suitable electrical power source may be used.

The battery pack 40 is preferably removably enhanced in a secured relation to the pump 38 through the use of one or more support devices. A preferred selection of support device is one or more corresponding hook and loop fastener and fabric portions (not shown), whereby corresponding portions are fixed to the pump 38 and the battery pack 40 in opposing relation. Alternatively, any suitable type of constricting band or strap, such as a strap including corresponding hook and loop fastener sections, may also be used to enhance a secured relation between the pump 38 and the battery pack 40. It will be appreciated that any other suitable type of attachment device may be used between the pump 38 and the battery pack 40. As shown in FIG. 5, the pump 38 is operable to be disposed in communication with the delivery tube 32 previously described in connection with FIG. 3. A dispensing tube 46 is also disposed in communication with the pump 38, to provide an output passageway from the pump 38 through which fluid from the fluid reservoir 18 can be dispensed to the user at a desired location. The dispensing tube 46 will be discussed below in connection with FIGS. 2 and 4.

Figure 6:
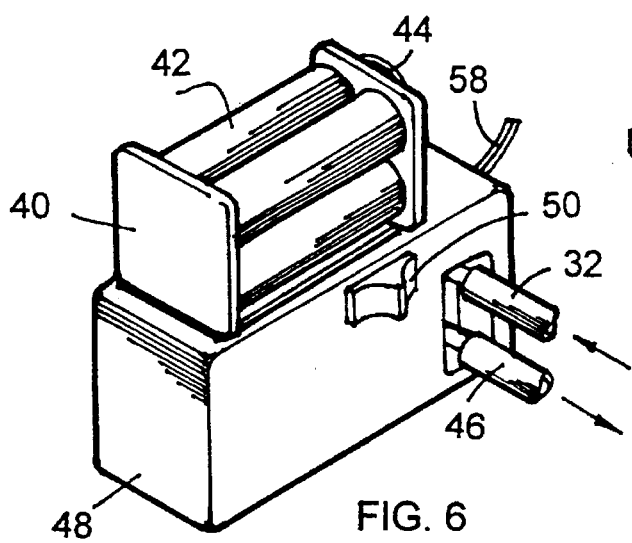
FIG. 6 is a perspective view of a battery pack and a second selection of electronic pump of the type used according to a preferred embodiment of the present invention.

Referring now to FIG. 6, it will be appreciated that multiple configurations and versions of the electronic pump system 14 may be used without departing from the spirit of this invention. As shown in FIG. 6, a second type of pump, referenced by the numeral 48, is shown to be associated with a battery pack 40 of substantially similar type as described above in connection with FIG. 5. In this arrangement of pump, however, the delivery tube 32 and dispensing tube 46 are disposed in communication with the pump 48 at a side connection location. This version of pump is also shown to include a master electrical switch 50 that is operable for activating the personal fluid delivery device 10 so that it can be subsequently selectively actuated as will be described in more detail below. A master switch 50 is advantageous if the personal fluid delivery device 10 is not to be used for an extended period of time, if the actuating mechanism described below is likely to cause fluid delivery when none is desired, or in other situations where operation of the personal fluid delivery device 10 is not desired. This arrangement avoids accidental or inadvertent operation of the personal fluid delivery device 10 in unwanted situations so as to avoid unintended depletion of battery or other electrical power and depletion of the fluid supply within the fluid reservoir 18. Although reference is made to the version of pump designated as 38 in the description herein, it will be appreciated that the pump 48 may be substituted for the pump 38.

Figure 4:
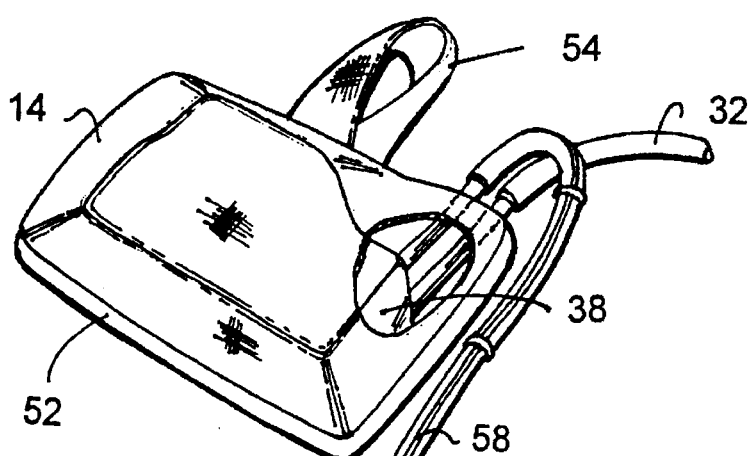
FIG. 4 is a partial cutaway view of an electronic pump system of the type used according to a preferred embodiment of the present invention.

Referring now to FIG. 4, the electronic pump system 14 is shown to include a pouch 52 that is operable for containing a pump, such as that shown at 38 in FIG. 5 or 48 in FIG. 6 and a battery pack such as that shown at 42. The pouch 52 is preferably constructed of the same or a similar material as the backpack 16, such as neoprene, although any suitable material may be used. The pouch 52 is preferably sized to contain the pump and battery pack, while being sufficiently small so as to be a convenient accessory for any fluid reservoir system with which it is used. As such, the pouch 52 may be configured in close association with the particular fluid reservoir used, such as the fluid reservoir 18. In one preferred arrangement, shown in FIG. 2, the pouch 52 is associated with the backpack 16 in a "piggyback" mounted fashion. The pouch 52 is shown to include a strap 54 that is attached to the backpack 16 at two locations to form a loop, such as by being sewn directly to the pouch material. In this arrangement, the pouch 52 can remain in proximity with the backpack 16 by passing the upper support straps 20 and 22 through the loop formed by the strap 54. The strap 54 is therefore preferably operable for supporting the entire weight of the pouch 52 when engaged with the upper support straps 20 and 22, including the weight of a battery pack and pump disposed therewithin. The strap 54 is made of a suitable material for accomplishing the above tasks, and may be of a nylon material or a material similar to that from which the pouch 52 is made, although other suitable materials may be used.

The pouch 52 may also include one or more types of suitable fasteners for enhancing a secured relation between the pouch 52 and the backpack 16. In a preferred arrangement, this is provided by affixing a portion of material containing hook and loop fasteners (not shown) by adhesive, by being sewn or by other suitable means to the pouch 52 upon the surface of the pouch 52 facing the backpack 16. Optionally, a corresponding fabric portion suitable for enhancing an engagement of the hook and loop fasteners may similarly be affixed to a surface of the backpack 16 against which the pouch 52 is desired to rest. This arrangement enhances a secured relation between the pouch 52 and the backpack 16 by reducing relative movement between the pouch 52 and the backpack 16 during physical activity which might occur given the engagement of the strap 54 and the upper support straps 20 and 22 alone. Preferably the pouch 52 is constructed so that a master electrical switch, such as that shown at 50 in FIG. 6, may be manipulated through the material from which the pouch 52 is made. The pouch 52 may also preferably include one or more openings (not shown) suitable for removing and replacing a battery pack and/or pump disposed within the pouch 52. As with the backpack 16, these openings may preferably be associated with suitable closures such as hook and loop fasteners, zippers, straps or other suitable closures.

Referring again to FIG. 4, the delivery tube 32 previously described in connection with FIG. 3 as being disposed in communication with the fluid reservoir 18 is connectable at its other end to the pump 38, through a suitable opening in the pouch 52. The dispensing tube 46, of the type previously discussed in connection with FIGS. 5 and 6, is also connectable at one end to the pump 38, and exits the pouch 52 through the same or an adjacent opening. The dispensing tube 46 is shown in nearly full length in FIGS. 2 and 4 and is preferably an elongated flexible tube of a material suitable for delivering a potable beverage, such as silicone. The dispensing tube 46 is also preferably of a sufficient length to be manipulable for dispensing fluid into the user's mouth, or for dispensing fluid at another desired location, such as upon a user's body. A typical length for the dispensing tube 46 is twelve inches, although it will be realized that other, especially longer, lengths of tube may be preferred in some applications. A preferred inside diameter for the dispensing tube 46 is 3/16 inch, although it will be appreciated that any other suitable diameter may be used. Also, one or more reducers, adapters or connectors of any suitable material may be utilized in accomplishing any of the connections set forth herein.

Figure 7:
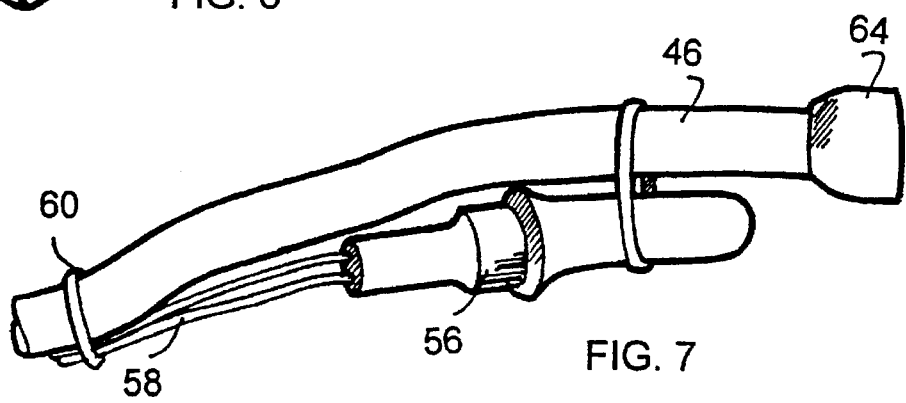
FIG. 7 is a perspective view of a dispensing tube with an attached actuating device according to a preferred embodiment of the present invention.

The electronic pump system 14 also includes an actuating device disposed in electrical communication with at least one of the electrical power supply and the pump. This actuating device is operable for selectively actuating the pump with a minimum of effort and manual dexterity. A preferred type of actuating device is a mercury switch, shown at 56 in FIGS. 2, 4 and 7. The mercury switch is best located for maximum efficiency near the dispensing end of the dispensing tube 46 and is electrically connected to the pump 38 by an actuating wire 58. An enlarged view of the dispensing end of the dispensing tube 46, with the mercury switch 56, is shown in FIG. 7. Preferably the actuating wire 58 extends from a connection point upon the pump 38, through a suitable opening in the pouch 52, and along the length of the dispensing tube 46 to the mercury switch 56. The actuating wire 58 is enhanced in a secured relation to the dispensing tube 46 by one or more retaining devices. One preferred type of retaining device is a band 60, which may be constructed of any suitable material. Alternatively, it will be appreciated that other suitable devices such as ties, rubber bands, and straps fitted with a hook and loop fastener portion may also be used. Preferably a plurality of bands 60 are used along the length of the dispensing tube 46.

Figure 9:
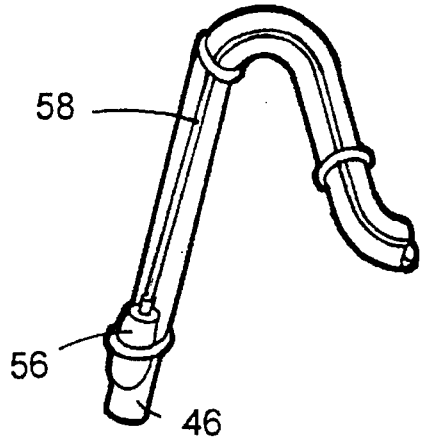
FIG. 9 is a perspective view of a dispensing tube and an actuating device, disposed in an non-operating position according to a preferred embodiment of the present invention.
Figure 10:
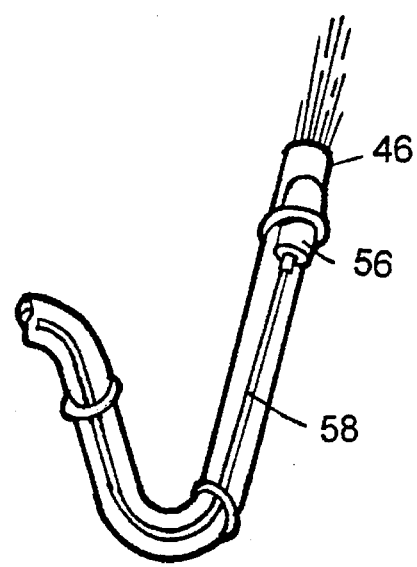
FIG. 10 is a perspective view of a dispensing tube and an actuating device, disposed in an operating position for dispensing fluid according to a preferred embodiment of the present invention.

The mercury switch 56 is preferably operable to selectively actuate the pump 38 based on its orientation. When the mercury switch 56 is positioned near the dispensing end of the dispensing tube 46, this arrangement provides the advantage of making the pump 38 selectively actuatable based on the manipulation of the dispensing end of the dispensing tube 46. This arrangement is preferred because it reduces the need for manual dexterity in operating the pump 38. As shown in FIGS. 9 and 10, when the dispensing end of the dispensing tube 46 is oriented in a downward vertical direction, the mercury switch 56 does not allow the electrical circuit with the pump 38 to be completed, so that the pump 38 does not run. Alternatively, when the dispensing end of the dispensing tube 46 is raised in an upwardly vertical direction, the mercury switch 56 allows the electrical connection with the pump 38 to be completed, thereby actuating the pump 38 and causing the pump 38 to remain in operation until the dispensing tube 46 is returned to a downward vertical position, thereby discontinuing the electrical connection with the pump 38. Referring again to FIGS. 2 and 4, the electronic pump system 14 is shown to include a bite valve 62 at the dispensing end of the dispensing tube 46. This arrangement is used when direct fluid delivery to the mouth is desired, as shown in FIG. 1. In FIG. 7, the dispensing tube 46 is shown to be provided with a nozzle 64 which serves to enhance a focus of a fluid stream exiting the dispensing tube 46. Alternatively, it will be appreciated that any other suitable attachment may be located upon the dispensing end of the dispensing tube 46, which may serve to direct or focus fluid exiting the dispensing tube 46. The dispensing tube 46 may also be free of any end attachment, as shown in FIGS. 8–13, and as described below.

Figure 8:
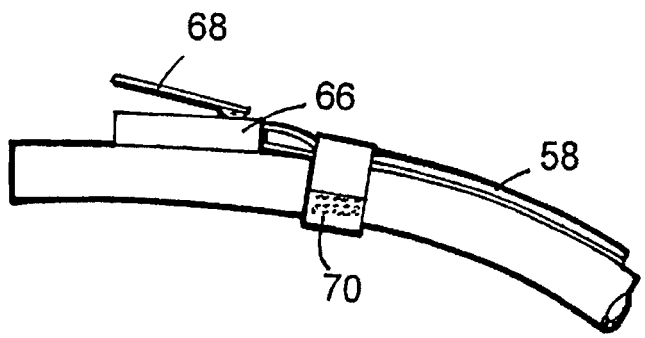
FIG. 8 is a perspective view of a dispensing tube end with a second selection of actuating device according to a preferred embodiment of the present invention.

Referring now to FIG. 8, there is shown another type of actuating device, shown in the form of a mechanical switch 66. The mechanical switch 66 is an alternate type of actuating device which may be used in accordance with the present invention. The mechanical switch 66 is operated by squeezing the spring loaded lever 68 against the remainder of the mechanical switch 66 which completes the electrical circuit with the pump 38 in similar manner as previously described. Preferably, the mechanical switch 66 is positioned upon the dispensing tube 46 at the dispensing end of the dispensing tube 46, as with the mercury switch 56. Also, the mechanical switch is most conveniently oriented so that the lever 68 need only be squeezed against the dispensing tube 46 in order to activate the pump 38. Thus, this arrangement also does not involve a great deal of manual dexterity, as it involves only a squeezing of the end portion of the dispensing tube 46 which must usually already be grasped by hand.

As with the mercury switch 56, an actuating wire 58 is disposed in electrical communication with the mechanical switch 66 and the pump 38. Preferably the actuating wire 58 extends from a connection point upon the pump 38, through a suitable opening in the pouch 52, and along the length of the dispensing tube 46 to the mechanical switch 66. The actuating wire 58 is again enhanced in a secured relation to the dispensing tube 46 by one or more retaining devices, such as those previously described. FIG. 8 shows a strap 70, fitted with corresponding hook and loop fastener and fabric portions. Each strap 70 may include hook and loop fastener portions which are exposed exteriorly to allow the dispensing tube to be removably attached to any conveniently located fabric piece or article of clothing, in a position where the pump 38 is deactivated.

Figure 11:
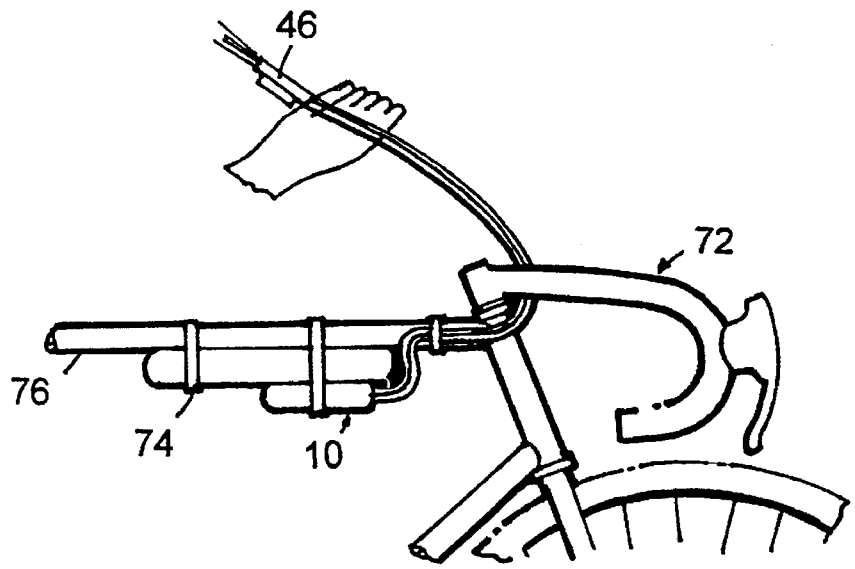
FIG. 11 is an elevational view of a personal fluid delivery device, mounted upon a bicycle, in operation, according to a preferred embodiment of the present invention.

Referring now to FIG. 11, there is shown an alternative mounting arrangement for the personal fluid delivery device 10 of the present invention. In this arrangement, the personal fluid delivery device 10 is shown to be mounted upon a bicycle 72 with the dispensing tube 46 operable for being directed upwardly toward the head of the bicyclist. The personal fluid delivery device 10 may be enhanced in a substantially secured relation to the bicycle 72 through the use of a plurality of support devices, such as straps 74 which substantially surround one or more portions of the personal fluid delivery device 10 and one or more portions of the bicycle 72 such as the crossbar 76. It will be appreciated, however, that the personal fluid delivery device 10 may be mounted on any convenient portion of a bicycle, such as on the handlebars or under the rider's seat.

Figure 12:
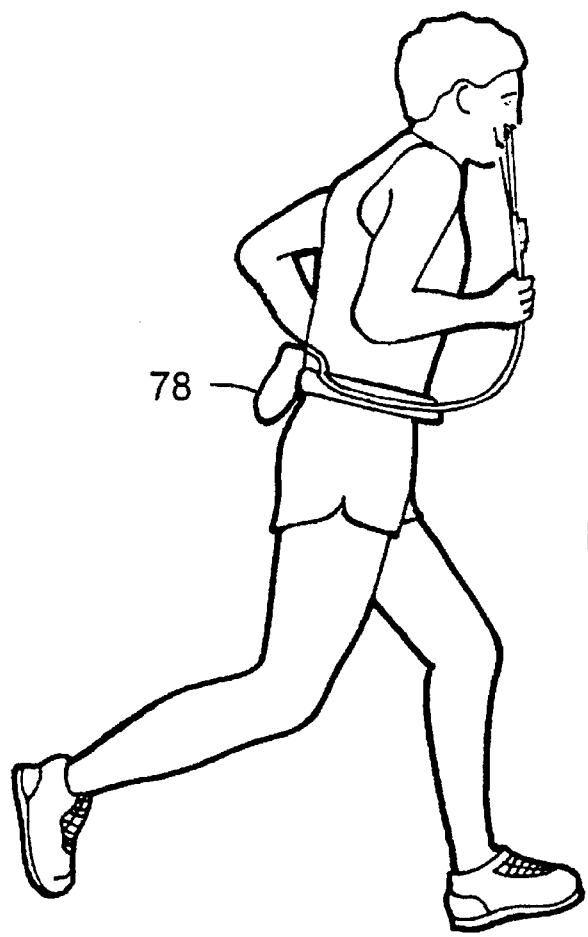
FIG. 12 is an elevational view of a personal fluid delivery device mounted in part within a waist pack according to a preferred embodiment of the present invention.
Figure 13:
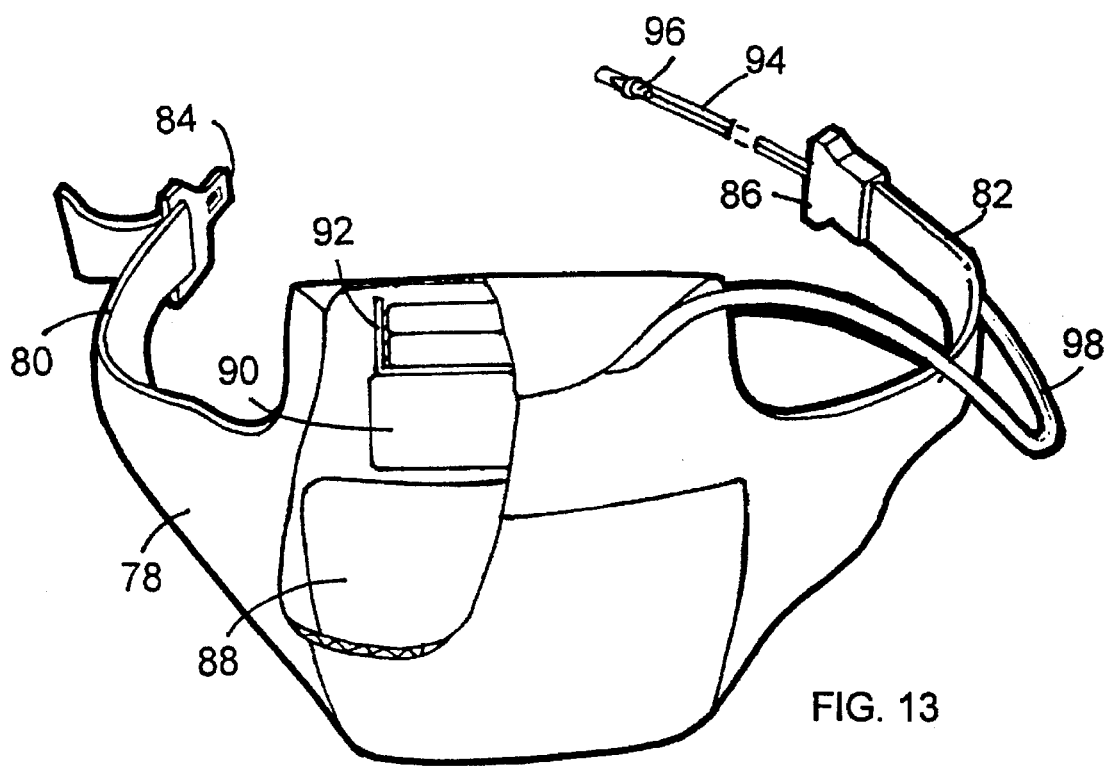
FIG. 13 is a partial cutaway view of a personal fluid delivery device contained in part within a waist pack according to a preferred embodiment of the present invention.

Referring now to FIG. 12, there is shown an alternative arrangement for a personal fluid delivery device of the present invention. In this arrangement, a waist pack 78 is provided, which is operable for containing components of the personal fluid delivery device upon a person's waist. This arrangement is useful in many situations, such as during a running activity as illustrated in FIG. 12. Referring now to FIGS. 12 and 13, the waist pack 78 is shown to be enhanced in a substantially secured relation around a person's waist through a suitable support device. In a preferred embodiment, this support device is provided as a plurality of belt straps 80 and 82 which are preferably adjustable in length and are operable for being engaged by buckle portions 84 and 86 disposed upon each end thereof. As can be seen in FIG. 13, the waist pack 78 is preferably operable to contain a fluid reservoir 88. The fluid reservoir 88 is constructed to a size and shape suitable for being contained within the waist pack 78, which typically has different dimensions than the backpack 16 previously described. The waist pack 78 is also shown to include a pump 90 which is substantially the same as the pump 38 and 48 previously described. A battery pack 92, which is substantially similar to the battery pack 40 previously described, is disposed in electrical communication with the pump 90 via a connection wire (not shown) as before. Preferably, as before, the pump 90 and battery pack 92 are enhanced in a substantially secured condition to each other, through the use of a suitable securing device, such as hook and loop fasteners, bands or straps. In similar manner as before, a dispensing tube 94 is disposed in communication with the pump 90 and exits the waist pack 78 for manipulation by the user. Also, an actuating device is again provided along the dispensing tube 94 for controlling the activity of the pump 90. Preferably, as before, this is provided as a mercury switch 96 which is disposed in electrical communication with at least one of the pump 90 and the battery pack 92 by an actuating wire 98 disposed therebetween. Alternatively, a mechanical switch may be employed as the actuating device in this arrangement as well. In this arrangement, a fluid is shown in FIG. 12 as being sprayed into the face of the user.

It will be appreciated that the foregoing description of the preferred embodiment of the invention is presented by way of illustration only and not by way of any limitation. For example, various other configurations for the personal fluid delivery device, including the fluid reservoir system and the electronic pump system may be used. In addition, these systems may be located within or upon various other types of attachments which may be hand-portable, body-carried or disposed in proximity to a person or an associated item of equipment with which the person is working. Also, other types of activating devices may be used. Various alternatives and modifications may therefore be made to the illustrated embodiments without departing from the spirit and scope of the invention.

What is claimed is:

1. A personal fluid delivery device comprising:
   a hand-portable fluid reservoir operable for containing a fluid;
   a hand-portable electronic pump disposed in communication with said fluid reservoir, said pump operable for delivering fluid from said reservoir;
   an electrical power supply for supplying power to the pump;
   a dispensing tube disposed in communication with said pump, said dispensing tube operable for providing a passageway for dispensing fluid from said fluid reservoir; and
   an actuating device disposed in electrical communication with at least one of said electrical power supply and said pump, said actuating device operable for selectively actuating said pump in response to a manipulation of said dispensing tube to a specific orientation.

2. The personal fluid delivery device according to claim 1, further comprising a delivery tube operable for providing a passageway for the delivery of fluid from said fluid reservoir to said pump.

3. The personal fluid delivery device according to claim 1, wherein said actuating device is a mercury switch disposed upon said dispensing tube.

4. The personal fluid delivery device according to claim 1, wherein said fluid reservoir is mountable upon a person's body.

5. The personal fluid delivery device according to claim 1, wherein said fluid reservoir is mountable upon a bicycle.

6. The personal fluid delivery device according to claim 1, further comprising a body-carried container suitable for supporting said fluid reservoir.

7. The personal fluid delivery device according to claim 1, further comprising a body-carried container suitable for supporting said fluid reservoir, said pump and said electrical power supply.

8. The personal fluid delivery device according to claim 1, wherein said electrical power supply is a battery pack comprising at least one disposable battery.

9. The personal fluid delivery device according to claim 1, wherein said electrical power supply is a battery pack comprising at least one rechargeable battery.

10. The personal fluid delivery device according to claim 1, wherein said electrical power supply and said pump are removably attachable to said fluid reservoir.

11. The personal fluid delivery device according to claim 6, wherein said container further includes said electrical power supply and said pump.

12. The personal fluid delivery device according to claim 6, wherein said electrical power supply and said pump are disposed within a pouch that is removably attachable to said container.

13. The personal fluid delivery device according to claim 1, wherein said dispensing tube includes a nozzle at a dispensing end thereof.

14. The personal fluid delivery device according to claim 1, wherein said dispensing tube includes a valve at a dispensing end thereof.

15. The personal fluid delivery device according to claim 1, wherein said fluid is a potable beverage.

16. A personal fluid delivery device comprising:
   a fluid reservoir operable for containing a potable beverage and located within a backpack suitable for mounting upon a person's back;
   an electronic pump disposed in communication with said fluid reservoir and operable for delivering fluid from said reservoir, said electronic pump located within a pouch that is removably attachable to said backpack;
   a battery pack disposed adjacent said electronic pump within said pouch, said battery pack operable for supplying electrical power to said electronic pump;
   a delivery tube disposed in communication with said fluid reservoir and said electronic pump, said delivery tube operable for providing a passageway for the delivery of fluid from said fluid reservoir to said electronic pump;
   a dispensing tube disposed In communication with said electronic pump, said dispensing tube operable for providing a passageway for the dispensing of fluid from said fluid reservoir by said electronic pump; and
   an actuating device disposed upon said dispensing tube, said actuating device disposed in electrical communication with at least one of said battery pack and said electronic pump, said actuating device operable for selectively actuating said electronic pump in response to a manipulation of said dispensing tube to a specific orientation.

17. A personal fluid delivery device comprising:
   a hand-portable electronic pump operable for being disposed in communication with a fluid reservoir for delivering fluid from said reservoir;
   an electrical power supply for supplying power to the pump; and
   an actuating device disposed in electrical communication with at least one of said electrical power supply and said pump, said actuating device operable for being disposed upon a dispensing tube in communication with said fluid reservoir and operable for selectively actuating said pump in response to a manipulation of said dispensing tube to a specific orientation.

18. The personal fluid delivery device according to claim 17, wherein said actuating device is mercury switch disposed upon said dispensing tube.

19. The personal fluid delivery device according to claim 17, further comprising a pouch operable for substantially containing said electronic pump and said electrical power supply, said pouch operable for being removably attachable to said fluid reservoir.

20. A personal fluid delivery device comprising a hand-portable electronic pump system operable for being disposed in communication with a fluid reservoir;

an actuating device disposed upon a dispensing tube for actuating the electronic pump system; and wherein said electronic pump system is actuated for transferring a fluid located within said reservoir in response to a manipulation of the dispensing tube to a specific orientation.

\* \* \* \* \*